(12) United States Patent  (10) Patent No.: US 7,839,290 B2
Chidakel et al. (45) Date of Patent: Nov. 23, 2010

(54) SONIC BUILDING RESCUE BEACON

(76) Inventors: David Welford Chidakel, 5 Colby St., Wellesley, MA (US) 02482; William Harris Groves, Jr., 53 Melrose St., Arlington, MA (US) 02474; Paul A. Boduch, 1 Garrett Dr., Northampton, NH (US) 03862; Michael Ellsworth Beach, 44 Greenville St., #3, Somerville, MA (US) 02143

( * ) Notice: Subject to any disclaimer, the term of this patent is extended or adjusted under 35 U.S.C. 154(b) by 462 days.

(21) Appl. No.: 11/687,660

(22) Filed: Mar. 18, 2007

(65) Prior Publication Data

US 2008/0100458 A1    May 1, 2008

Related U.S. Application Data

(60) Provisional application No. 60/856,050, filed on Nov. 1, 2006.

(51) Int. Cl.
*G08B 23/00* (2006.01)
*G08B 21/00* (2006.01)
(52) U.S. Cl. .................... 340/573.1; 340/690
(58) Field of Classification Search .......... 340/573.1, 340/545.5
See application file for complete search history.

(56) References Cited

U.S. PATENT DOCUMENTS

| 4,850,031 | A | 7/1989 | Allsop |
| 5,172,110 | A | 12/1992 | Tiefengraber |
| 5,519,403 | A | 5/1996 | Bickley et al. |
| 5,955,982 | A | 9/1999 | Moulin |
| 6,031,482 | A | 2/2000 | Lemaitre et al. |
| 6,181,244 | B1 * | 1/2001 | Hall et al. ............... 340/541 |
| 6,246,863 | B1 | 6/2001 | Kampel |
| 6,260,508 | B1 | 7/2001 | Morse |
| 6,388,617 | B1 | 5/2002 | Flood |
| 6,496,111 | B1 * | 12/2002 | Hosack ............... 340/540 |
| 6,771,163 | B2 | 8/2004 | Linnette et al. |
| 6,876,326 | B2 | 4/2005 | Martorana |
| 6,933,889 | B1 | 8/2005 | Wolf |
| 6,963,301 | B2 | 11/2005 | Schantz et al. |
| 7,038,584 | B2 | 5/2006 | Carter |
| 7,088,284 | B2 | 8/2006 | Young |
| 7,102,508 | B2 | 9/2006 | Edelstein et al. |
| 7,116,272 | B2 | 10/2006 | Wolf et al. |
| 2003/0129977 | A1 | 7/2003 | Oblon et al. |
| 2004/0172191 | A1 * | 9/2004 | Vitikainen et al. ......... 701/208 |
| 2005/0270234 | A1 | 12/2005 | Malin et al. |
| 2006/0046687 | A1 | 3/2006 | Kwon |
| 2006/0148423 | A1 | 7/2006 | Sharpe |
| 2006/0284732 | A1 * | 12/2006 | Brock-Fisher ........... 340/573.1 |
| 2007/0013526 | A1 | 7/2007 | Kazdin |
| 2007/0188321 | A1 * | 8/2007 | Stenlund ............... 340/539.26 |

* cited by examiner

*Primary Examiner*—Benjamin C Lee
*Assistant Examiner*—Cal Eustaquio

(57) ABSTRACT

A safety device which emits sounds that guide rescuers to people trapped in collapsed structures.

5 Claims, 3 Drawing Sheets

Flow Chart Showing Functions of the Sonic Building Rescue Beacon

BLOCK DIAGRAM OF SONIC BUILDING RESCUE BEACON

Flow Chart Showing Functions of the Sonic Building Rescue Beacon

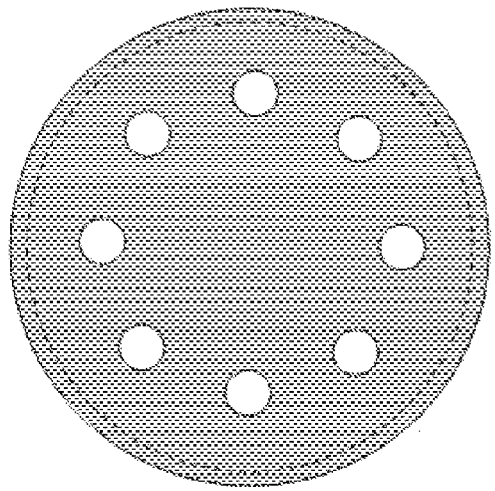

Top View

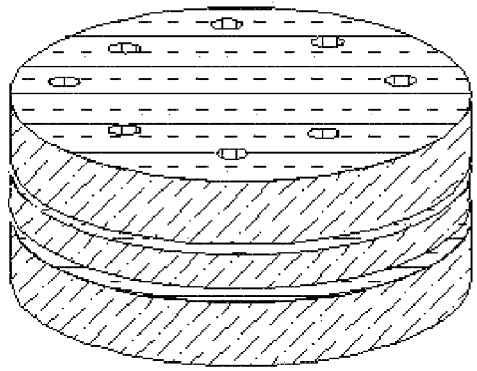

Exploded View

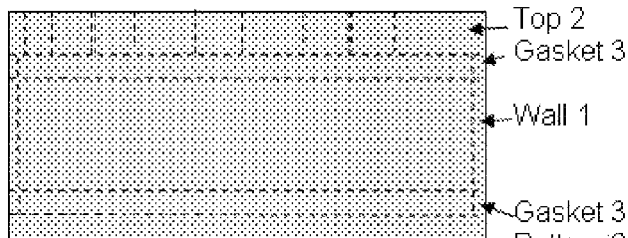

Elevation

- Top 2
- Gasket 3
- Wall 1
- Gasket 3
- Bottom 2

Typical Dimensions

With a diameter of 4 inches, the top and bottom of the enclosure would consist of steel plates, approximately, 1/8 inches in thickness, while the outer steel walls of the enclosure would be approximately 1/4 inch. The depth of the enclosure, in this example, would be about an inch.

FIGURE 3

The Enclosure of the Sonic Building Rescue Beacon

SONIC BUILDING RESCUE BEACON

BACKGROUND OF THE INVENTION

1. Field of the Invention

This invention is related to beacons that are used to guide rescuers to individuals who are lost, buried, or trapped. Specifically, it relates to the use of sonic (sound generating) rescue beacons, designed to guide rescuers to individuals who are trapped in a structure such as a home or office building which has collapsed as a result of a natural disaster, an accident, or an intentional act of sabotage.

2. Description of the Related Art

When people are trapped under collapsed structures, rescuers often arrive with a variety of "aids" including specially trained dogs, thermal imaging cameras, search robots, specialized listening devices, flexible fiber optic cameras, pole-mounted and robotic search cameras, Infrared thermal imaging, microwaves to detect breathing or motion, carbon dioxide detection, and radio receiving devices sensitive to transmissions from cell phones or walkie-talkies which are sometimes in the possession of victims. However none of the aforementioned methods is consistently successful in these difficult circumstances and, every year, many thousands of individuals perish in collapsed structures from earthquakes, tornadoes and the like. The first 24 hours, following a disaster are the most critical. For example, after an earthquake, 90% of the survivors are saved in that period by rescuers using simple tools. It takes time for specialized rescue teams to arrive. By that time, many lives are lost. Therefore, there exists a need for a way to amplify the effectiveness of trapped survivors who are trying to bring their plight to the attention of first responders during the critical first day and, as well, to amplify the effectiveness of rescuers in locating survivors in that time period.

One way to achieve this "amplification" of effort is with rescue beacons of various kinds which are in proximity to the victims. A number of devices use the electromagnetic spectrum (radio waves) for this purpose. For example, U.S. Pat. No. 5,193,215, issued on Mar. 9, 1993, to Anthony L Olmer, describes a radio device which can transmit a distress signal and give precise local coordinates in the transmission. U.S. Pat. No. 5,995,982, issued on Sep. 21, 1999 to Marc Jean Moulin, describes a simple radio location device intended to aid in the rescue of victims of avalanches. Devices like Moulin's, rely on the notion that rescuers with equipment to sense "field strength" will succeed in localizing a radio emission source.

These, and other, radio devices can lead searchers to a general location over vast distances. But, since structural collapses rarely go unnoticed—especially where they are associated with disasters such as earthquakes, landslides, tornadoes, and so on—radio location is rarely needed. In such disasters, the challenge is to know where within the field of rubble to focus the effort to recover survivors. In such circumstances, radio beacons may be attenuated so severely by the overlying rubble that they can no longer be detected and the distribution pattern which, because of the characteristics of antennas, is often very irregular anyway, may become even more so, frustrating the efforts of rescuers.

There are, of course, more sophisticated radio location techniques. For examples, U.S. Pat. No. 6,031,482, issued on Feb. 29, 2000 to Lemaitre, et al, describes a technique using multiple antennas to detect an electromagnetic signature of movement from a victim buried in an avalanche. This system is designed, specifically, for snow rescue and its efficacy in a field of rubble is not described. In any case, first responders are unlikely to be equipped with advanced radio location equipment which may take hours or even days to arrive. Victims who may be seriously injured require assistance as soon as possible.

SUMMARY OF THE INVENTION

A safety device which uses its loudspeaker to guide rescuers to victims of a collapsed structure, doing so when certain predetermined rescue phrases or sounds are recognized by its microprocessor. If, based upon its own measurements of acceleration, power line voltage or other phenomena, this invention identifies a probable building collapse, it continuously emits voice prompts. Said voice prompts ask anyone who can hear them to respond with certain rescue phrases or sounds to indicate that they require help.

OBJECTS AND ADVANTAGES

Accordingly, several objects and advantages of the present invention are:

(a) To generate sounds to lead rescuers to the area within the collapsed structure where trapped individuals are located.

(b) To alert rescuers, using speech or other sounds, that people, trapped in a collapsed structure such as a home or office building, are alive and in proximity to the device.

(c) To maintain a continuing audible rescue signal throughout the critical period wherein help is needed even if the entrapped individuals are unable to do so because of their weakened conditions, injuries, or need to for sleep.

(d) To provide an enclosure for this invention which is strong enough to protect it against a loads and impacts such as those that may occur during a building collapse.

BRIEF DESCRIPTION OF THE INVENTION

In certain types of disasters, individuals may be trapped beneath rubble and there exists a need to guide rescuers to the survivors.

In response to certain voice commands or certain sounds, this invention emits a series of sounds 1) confirming for rescuers that someone has interacted with the system (survivors are present) and 2) providing a sound pattern that rescuers can use as they attempt to locate said survivors.

In addition to responding to certain words or other sounds, this invention also responds to certain conditions which are commonly associated with the collapse of a building such as, but not limited to, the loss of electrical power and the presence of impact forces. When such conditions are recognized by this invention's sensors, its loudspeaker continuously emits a request that persons within hearing range respond by (in this example) using certain words or making certain sounds (such as, for example, a fixed number of taps). Other possible responses might include but are not limited to wireless or infrared devices. This exemplary invention's microprocessor always responds to certain words or commands by generating a sound pattern for rescuers—a sonic beacon—whereas its use of voice prompts is limited to its recognition of a building collapse condition. Thus, even in a situation where the microprocessor fails to detect a building collapse, a victim may be able to trigger its sound beacon by saying certain easily anticipated "rescue words" such as "Help".

In this example, the device can be "reset" (cease emitting "rescue" sounds and resume normal monitoring of its surroundings) by pressing a button, by voice command or by other techniques such as the use of a handheld wireless device.

BRIEF DESCRIPTION OF THE DRAWINGS

FIG. 3 shows an example enclosure that is designed to survive the impact of a collapsed building.

DETAILED DESCRIPTION OF THE PREFERRED EMBODIMENT

Figure 1:
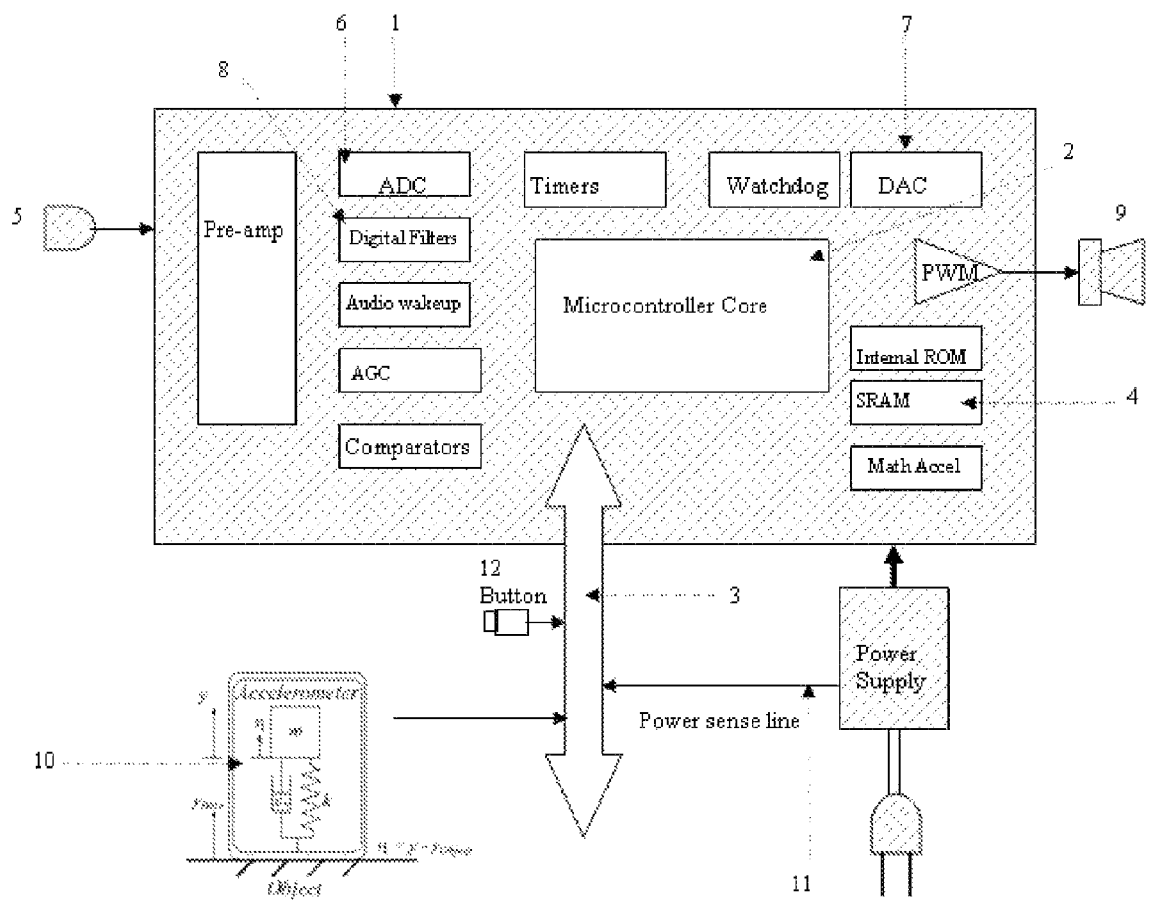
FIG. 1 is a block diagram illustrative of a suitable device with which the invention may be implemented.

With reference to FIG. 1, an exemplary system for implementing the invention includes a microcomputer (1). Components of said microcomputer include, but are not limited to, a processing unit (2) and a system bus (3) that couples to various system components including the system memory (4). In addition, the exemplary system includes a microphone (5) which is connected to circuits which provide signal conditioning, and an analog to digital converter (6) to sample the audio signals from said microphone and transform them into digitized data in a data buffer which is accessible to said microcomputer. Furthermore, the exemplary system includes another data buffer which is connected to a digital to analog converter (7) wherein the output of said digital to analog converter is connected to signal conditioning circuits (8) and then output through a connected loudspeaker (9). While the exemplary system is a standalone device, other embodiments might include combining the functions of this invention with other devices such as smoke alarms, radios, and other electronic devices.

Continuing to reference FIG. 1, in this exemplary system,

Impact Force the accelerometer output (10) is continuously sampled by the microprocessor and is then converted by the microprocessor to an "impact force". The processor keeps track of the largest value of said impact force within a fixed observation period.

Voice Prompts

In this example, if the state of the power sense line (11) from the unit's power supply indicates that there has been a power failure in the building's electrical mains, this invention's microprocessor, operating, in that case, on its backup batteries, would delay for a fixed period and then test said power sense line again. If the power is still off and if the impact force, the maximum impact force over the observation period, is greater than the force threshold, then the microprocessor behaves as though the building has collapsed by emitting, through its loudspeaker, a request that persons within range utter a certain rescue phrase such as "rescue help" or make a particular sound such as, for example, three taps.

This particular method of activating the invention's voice prompts is only exemplary. Other methods of determining a possible building collapse, while also utilizing signals from the power supply and the accelerometer, may combine them in other ways. Still other methods may rely on signals from tilt sensors, microphones, or other devices, combining said signals in various ways to determine that the building has collapsed.

Quieting the Voice Prompts

If the invention's microprocessor recognizes that someone has pronounced the "muting phrase" (for example," Shut up!"), or has pressed the button (12) while the voice prompts are active as described above, the sound of the voice prompts is silenced and is inactivated until it is again triggered by external events. Other examples of "muting" actions might include (but are not limited to) devices such as wireless "keyfobs" or wireless remote controls or infrared signaling systems.

Sonic Beacon

In this example, if the invention's microprocessor recognizes that someone has pronounced the "rescue phrase" (for example, "Rescue help"), or made a designated sound (such as a certain number of taps), the microprocessor begins to emit a sound beacon—continuous or intermittent sounds through its loudspeaker. For example, said sound beacon might be composed of beeps of varying intensity and might contain phrases such as "People are trapped at this location and require help". The purpose of said sound beacon is to 1) lead rescuers to the trapped individuals and 2) to provide reassurance to those who are trapped.

This exemplary invention's microprocessor always responds to certain words or commands by generating a sound pattern for rescuers—a sonic beacon—whereas its use of voice prompts is limited to its recognition of a building collapse condition. Thus, even in a situation where the microprocessor fails to detect a building collapse, a victim may be able to trigger this invention's sound beacon by saying certain easily anticipated "rescue words" such as "Help".

While this example relies on the use of words and sounds to respond to the microprocessor's voice prompts, other methods include (but are not limited to) devices such as wireless keyfobs, wireless remote controls, or infrared signaling systems.

Quieting the Beacon

Figure 2:
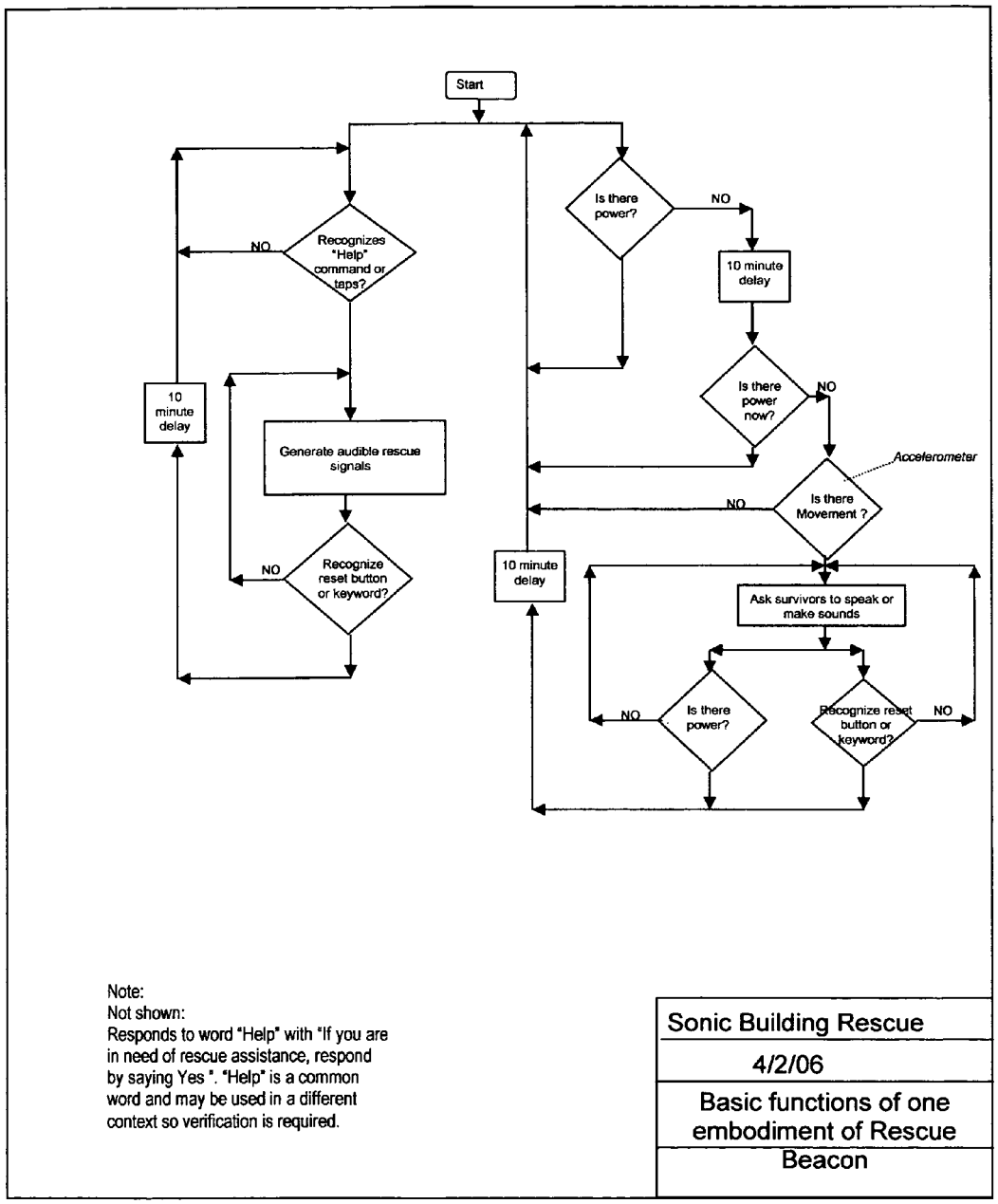
FIG. 2 is a flow chart for the software controlling the microprocessor of the Sonic Building Rescue Beacon. The flow chart shows the sequence of events that constitute the behavior of the device

If, as in this example, the invention's microprocessor recognizes that someone has pronounced the muting phrase (for example," Shut up!"), or has pressed the button (12) while the sound beacon is active as described above, the sounds of the beacon are silenced until the devices is again triggered by a recognized event such as a phrase, sound, or button press. While this example relies on the use of words, sounds, or a button press to mute the sonic beacon, other methods include (but are not limited to) devices such as wireless keyfobs wireless remote controls or infrared signaling systems The steps depicted above are illustrated in the flow chart, FIG. 2.

The Enclosure

This invention is contained in an impact-resistant enclosure (FIG. 3) of metal, plastic or other materials. The structure of said enclosure must be sufficient to bear the highest likely impact forces under the conditions of a building collapse. Lacking sufficient data on collapse conditions in the full range of possible disasters, the design load for said enclosure is to be based on a design pressure of 4,300 pounds per square foot which is half the pressure at the center of the atomic bomb that was detonated at Hiroshima, Japan (8,600 pounds per square foot). The cross sectional area of the walls (1) of said enclosure is such that the compressive stresses from said design pressure are within the design limits of the material used. The vertical dimension of the walls of said enclosure must be limited in dimension so as to avoid a collapse due to failure in buckling as determined by established principles of design. The top and the bottom (2) of said enclosure shall be designed according to established design principles to carry the stresses from said design load in flexure and shear, spanning the space between said walls.

The walls of said enclosure are sandwiched between compliant gaskets (3) to redistribute and dampen any concentrated dynamic impact loads.

We claim:

1. A building mounted safety device, used to aid in the rescue of trapped survivors from beneath the rubble of a building collapse, comprising:
   a. at least one sensor to detect a probable collapse of said building,
   b. an enclosure such that said safety device is able to function and withstand the impact forces of a collapsed building,
   c. a voice playback means to sound a predetermined voice prompt request from said device in order to elicit a response from said trapped survivor, after a probable building collapse has been detected by at least one of said sensor,
   d. a sound recognition means to detect a predetermined response from said trapped survivor, said predetermined response selected from the group consisting of predetermined voice commands or a sequence of tapping sounds,
   e. a logical decision means for establishing that at least one trapped survivor is in close proximity to said safety device, when said trapped survivor has responded to said voice prompts and has provided said safety device with said predetermined response,
   f. a sound generating means to emit sounds to attract potential rescuers to the proximate location of said trapped survivor in response to said establishing of said predetermined response
   whereby anyone who is uninjured and located near the collapsed building may be enlisted to become a potential rescuer and to immediately begin rescue of said trapped survivor, without said potential rescuer requiring the use of special training or special equipment, simply by following said sounds from said safety device to reach said trapped survivor.

2. A method used to aid in the rescue of a trapped survivor from beneath the rubble of a building collapse, comprising:
   a. installing a plurality of safety devices throughout a building,
   b. providing at least one sensor to detect a collapse of said building within at least one of said safety devices,
   c. providing an enclosure for each of said safety devices so that they are able to function and withstand the impact forces of a collapsed building,
   d. detecting that a probable building collapse has taken place by the response of at least one of said sensors,
   e. sounding a predetermined voice prompt request from said devices in order to elicit a response from said trapped survivor upon the detection of a probable building collapse,
   f. providing a decision controller which:
      continues to sound a predetermined voice prompt request for a predetermined interval of time after the detection of a probable building collapse, until, after said predetermined interval of time, said safety device will remain silent, if no said predetermined response selected from the group consisting of voice commands or a sequence of tapping sounds is detected, and
      establishes that at least one trapped survivor is in close proximity to said safety device, when said trapped survivor has responded to said voice prompt request and has provided said safety device with said predetermined response, thereby enabling said safety device to begin emitting sounds to attract potential rescuers to the proximate location of said trapped survivor who has responded to said safety device with said predetermined response, said sounds continuing to be emitted even if the trapped survivor later becomes unable to speak,: whereby anyone who is uninjured and located near the collapsed building may be enlisted to immediately begin to rescue said trapped survivors, without the use of special training or special equipment, by following said sounds from said safety device to reach said trapped survivor who is in close proximity to said safety device.

3. A building mounted safety device that augments the efforts to obtain help for people who have become trapped under the rubble of a collapsed building, comprising:
   a. at least one sensor to detect a probable collapse of said building,
   b. an enclosure such that said safety device will be able to function and withstand the impact forces of a collapsed building,
   c. a sound generating means to sound a predetermined voice prompt from said device in order to elicit a response from a trapped survivor,
   d. a sound recognition means to detect a predetermined voice command response from said trapped survivor,
   e. an electronic decision means to establish that at least one trapped survivor is in close proximity to said safety device when said trapped survivor has responded to said voice prompts and has provided said safety device with said voice command response,
   f. a means to emit a series of sounds to attract potential rescuers to the proximate location of said trapped survivor who has responded to said safety device with said voice command response, said series of sounds being emitted even if the trapped survivor subsequently becomes unable to speak,
   whereby anyone who is uninjured and located near the collapsed building may be enlisted to immediately begin to rescue said trapped survivor, without the use of special training or special equipment, by following the said series of sounds from said safety device to reach said trapped survivor, once said safety device begins emitting said series of sounds, even if said trapped survivor may subsequently become unable to speak.

4. A building mounted safety device that augments the calls for help of people who have become trapped under the rubble of a collapsed building, comprising:
   a. at least one sensor to detect a probable collapse of said building,
   b. an enclosure such that said safety device withstands the impact forces of a collapsed building,
   c. a first means to sound a predetermined voice prompt request from said device, after said sensor detects a probable building collapse, in order to elicit a response from a trapped survivor, said predetermined voice prompt request sounding means comprising an audio speaker driven by an electronic amplifier, where the audio message content of said predetermined voice prompt request is selected from the group consisting, of a prerecorded message or a synthesized voice, d. a second means to detect a predetermined voice command response from said trapped survivor, when said trapped survivor is located in close proximity to said safety device, consisting of a microphone and electronics to detect sounds and voice recognition capability to recognize when said predetermined voice command response is spoken by said trapped survivor, e. a third means to establish that both a probable building collapse has taken place, by the response of at least one said sensor, and also that there is at least one responsive trapped survivor who is in close proximity to said safety device and who has responded to said voice prompt request with said voice command response, f. a fourth means to emit a series of sounds to attract potential rescuers to the proximate location of said responsive trapped survivor who has responded to said safety device, thereby anyone who is uninjured and located near the collapsed building may be enlisted to immediately begin to rescue said responsive trapped survivor, without the use of special training or special equipment, by following the said series of sounds from said safety device to reach the proximate location of said responsive trapped survivor, whereby said safety device continues to emit said series of sounds to attract said potential rescuers, even if said responsive trapped survivor becomes unable to speak, once said safety device has become activated by the detection of said predetermined voice command response from said responsive trapped survivor, thus extending the call for help of said responsive trapped survivor beyond what they are capable of, and thus improving the chances of the rescue of said responsive trapped survivor.

5. A building mounted safety device used to aid the rescue of trapped survivors from beneath the rubble of a collapsed building, comprising:

a. at least one sensor to detect a probable collapse of said building, said sensor being selected from the group consisting of an accelerometer and a power mains sensor, b. an enclosure to protect said safety device such that it will be able to function while withstanding the impact forces of a collapsed building, c. a first means to sound a predetermined voice prompt request from said device, after said sensor detects a probable building collapse, in order to elicit a response from a trapped survivor, said predetermined voice prompt request sounding means comprising an audio speaker driven by an electronic amplifier, where the audio message content of said predetermined voice prompt request is selected from the group consisting of a prerecorded message or a synthesized voice, d. a second means to detect a predetermined response from said trapped survivor, when said trapped survivor is located in close proximity to said safety device, said second means consisting of a microphone and electronics to detect sounds and sound recognition capability to recognize when said predetermined response is given by said trapped survivor, said predetermined response being selected from the group consisting of voice commands or a sequence of tapping sounds, e. a third means to establish that both a probable building collapse has taken place, by the response of at least one said sensor, and also that there is at least one responsive trapped survivor who is in close proximity to said safety device and who has responded to said voice prompt request with said predetermined response, f. a fourth means to emit a series of sounds to attract potential rescuers to the proximate location of said responsive trapped survivor who has responded to said safety device,:

g. thereby anyone who is uninjured and located near the collapsed building may be enlisted to immediately begin to rescue said responsive trapped survivor, without the use of special training or special equipment,: by following the said series of sounds from said safety device to reach the proximate location of said responsive trapped survivor, whereby said safety device continues to emit said series of sounds to attract said potential rescuers, even if said responsive trapped survivor becomes unable to speak, once said safety device has become activated by the detection of said predetermined response from said responsive trapped survivor, thus extending the call for help of said responsive trapped survivor beyond what they are capable of, and thus improving the chances of the rescue of said trapped survivor.

* * * * *